April 12, 1960   T. S. HARKNESS ET AL   2,932,581
CINEMATOGRAPH SCREENS
Filed Feb. 26, 1958
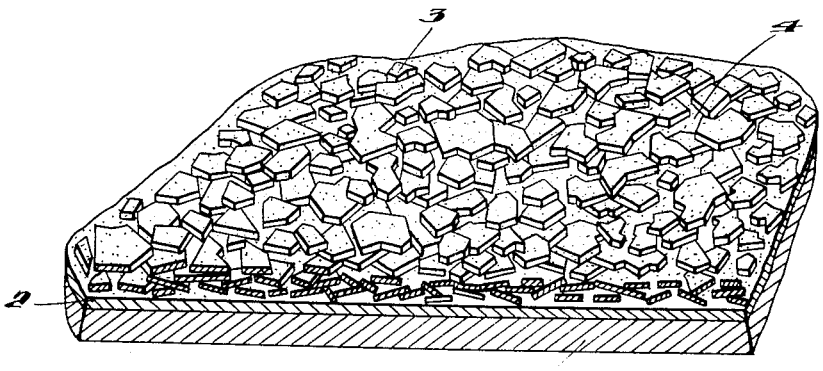
INVENTORS
Thomas Smith Harkness and
Otto Kurt Kolb,
BY   Pierce, Scheffler & Parker
their ATTORNEYS

United States Patent Office 2,932,581
Patented Apr. 12, 1960

2,932,581

CINEMATOGRAPH SCREENS

Thomas Smith Harkness and Otto Kurt Kolb, London, England, assignors to Andrew Smith Harkness Limited, London, England Application February 26, 1958, Serial No. 717,661

Claims priority, application Great Britain March 1, 1957

10 Claims. (Cl. 117—33.5)

This invention relates to cinematograph screens, particularly of the kind comprising a base sheet material of fabric or synthetic plastic coated with one or more layers designed to produce certain reflection characteristics.

The invention is based on the phenomenon of luminescence by virtue of which certain substances are capable of absorbing invisible radiations and re-emitting radiations of a longer wave-length in the visible region of the spectrum.

In a prior proposal it has been suggested to use inorganic luminescent agents in the form of powder incorporated in the image forming surface. The re-emission resulting from the use of said agents is said to be in a region of the visible spectrum having a peak wave-length of 5500 Angstrom, this corresponding to a pale green-yellow color.

From the optical point of view re-emission in said region of the spectrum does not produce the best utilization of luminescence, a bluish light being far more effective since it tends to counteract the effect of screen surface discoloration which inevitably ensues after a certain period of service, said discoloration being due, in the main, to deterioration of the lacquers used in the coating of the screen and tending to give the screen a grey-like or yellow appearance.

A major object of the present invention is, therefore, the enhancement of screen brightness over long periods of service by the application of luminescent materials re-emitting light in such region of the spectrum as to counteract to a considerable extent the effect of the screen discoloration.

In recent years, a new group of organic substances generically referred to as optical brightening agents has been developed and applied to the brightening or "super-bleaching" of textiles, papers, etc. Said agents are, on the whole, fluorescent materials which re-emit light over a wide range of the visible spectrum, but only those counteracting or compensating for the greying or yellowing of fabrics by re-emission in the near-blue region are in practical use.

The problem as regards the brightening of a cinematograph screen is somewhat similar to the brightening of fabrics, except that insolubility in water and good dispersion and dissolution of the optical brightening agent in suitable solvent and lacquers are essential.

The invention consists of a cinematograph screen comprising a sheet of fabric or synthetic plastic provided with at least one coating layer carrying particles of a substantially water-insoluble fluorescent optical brightening agent capable, when impinged upon by invisible radiation in the ultra-violet and near ultra-violet regions, of counteracting or compensating for the yellowing or greying of materials in the surface of the screen.

The optical brightening agent is effective in quantities incomparably smaller than the quantities of other luminescent materials. This ensures that the optical properties for which the coating has been designed are not impaired by the light screening effect of opaque particles since these particles are very widely distributed or even dissolved when suitable solvents and lacquers are used.

The best way of realizing the invention is to incorporate a suitable brightening agent either in the composition forming the surface coating of the screen or in a separate top coat of clear lacquer, the essential requirement being that the brightening agent particles shall be widely distributed and effectively exposed to the exciting radiation.

Suitable optical brighteners are derivatives of certain organic compounds such as symmetrical and asymmetrical stilbenes, amino-courmarines, pyrazolines, benzidine-sulfones, bisoxazoles, imidazoles, dibenzimidazoles.

One embodiment of the invention will now be described by way of example only.

A sheet of material forming a suitable base for a cinematograph screen, for example, a polyvinylchloride sheet, is sprayed with a white pigment coating of titanium dioxide in a suitable lacquer acting as a carrier. To this a further coating is applied consisting of a dispersion of plate-like basic lead carbonate crystals in a binder. Finally, a top coating of varnish containing an optical brightener is added. Instead of applying the varnish top coating containing the optical brightener, the reflectance layer containing the plate-like crystals of basic lead carbonate dispersed in polyvinyl lacquer can contain, intermingled with the crystals, the optical brightener in this layer to an extent of 0.003% to 0.3%.

The brightening agent need not be provided in a top coat, it being equally effective when mixed in the material forming the pigment coating or, to a lesser extent, when incorporated in a priming coat such as the above titanium dioxide.

In every case the optimum percentage per weight of material in which the brightening agent is carried ranges from 0.003 to 0.3%. Higher percentages are possible up to about 1 percent, although the effect is not necessarily increased. Beyond that, there occurs a certain deterioration of the reflection characteristics through light screening action and therefore there is clearly no point in exceeding such limit.

A particularly effective and useful optical brightener is a symmetrical stilbene derivative, which is marketed by Geigy Co. under the registered trade name of Tinopal PCRP. Said chemical is insoluble in water and highly soluble in hydrocarbon, ketonic and other organic solvents, as indicated in the table below:

| Solvent | Solubility, Parts Per 100 Parts Solvent, w./w. |
|---|---|
| Acetone | 12.5 |
| Alcohol | 2.6 |
| Benzene | 23.5 |
| Dioctyl Phthalate | 8.1 |
| Tritolyl Phosphate | 10.8 |
| Dioctyl Sebacate | 5.6 |

One very desirable property of Tinopal PCRP is its high stability to light when exposed to illumination for protracted periods.

Another useful compound is one from the group of water-insoluble but organic solvents-soluble derivatives of dibenzimidazole which is marketed under the registered trade name of Uvitex ER which may be applied dispersed in polyesters such as Dacron and Terelene, both registered trade names.

While it has been shown that the brightening agent may be incorporated in any of the screen coatings, it may, in fact, be included with advantage in all the coatings where a plurality of coatings is used.

Optical brighteners are not effective unless they are impinged upon by ultra-violet or near ultra-violet light. In a cinematograph projection apparatus the light source is often rich in said radiations and, although optical glass cuts out most of the available output, some radiation, particularly in the lower wavelength, does get through to the point of allowing a substantial advantage to be derived from the present invention.

In the case where the optical brightener is added to a luster paint coating, consisting for example of a heavy metal compound such as lead or bismuth in laminar crystals—which coating provides higher reflectivity at the center and considerable falling off at the sides—it can also be used to achieve a diffusing action for causing a widening of the angle of reflection, thus giving substantially uniform distribution of reflected light in the horizontal and vertical directions.

The invention is illustrated in the accompanying drawing, in which the single figure is a diagrammatic cross-sectional view through a cinematograph screen embodying principles of the present invention.

In the drawing, a sheet of polyvinyl chloride, 1, constitutes the base of the screen. On one side of sheet 1 is a layer 2 of coating composition consisting of titanium dioxide pigment, about 5%, dispersed through the solids residue of a binder lacquer of polyvinyl chloride and copolymerized vinyl-acetate. Overlying this gloss pigment coating is a reflectance layer 3 of a coating composition consisting essentially of flat, plate-like crystals of basic lead carbonate dispersed in polyvinyl lacquer solids. Over layer 3 is a clear top layer of Tinopal PCRP in varnish solids.

Optical brightening agents as such are described in "Soap and Chemical Specialties" from page 44 of the November 1955 issue and from page 58 of the December 1955 issue.

We claim:

1. A cinematograph screen comprising a base sheet formed of a sheeted material selected from the group consisting of fabric and synthetic plastic provided with at least one coating accessible to invisible radiation in the ultra-violet and near ultra-violet regions and carrying in homogeneous dispersion therein particles of an organic, water-insoluble but organic solvents-soluble optical brightening agent capable of emitting bluish white light when impinged upon by invisible radiation in the ultra-violet and near ultra-violet regions, the brightening agent being present in said coating in a weight percent of between 0.003% and 1.0%.

2. A screen as claimed in claim 1, wherein the optical brightening agent is carried in a transparent coating overlying a reflective coating.

3. A screen as claimed in claim 1, wherein the optical brightening agent is carried in a reflective coating.

4. A screen as claimed in claim 1, wherein the optical brightening agent is carried both in a reflective coating and in a transparent coating overlying said reflective coating.

5. A screen as claimed in claim 4, wherein the reflective coating overlies a priming coating and wherein said optical brightening agent is carried in said priming coating.

6. A screen as claimed in claim 1, wherein the optical brightening agent is a member selected from the group of organic compounds consisting of water-insoluble but organic solvents-soluble derivatives of symmetrical and asymmetrical stilbenes, amino-courmarines, pyrazolines, benzidinesulfones, bisoxazoles, imidazoles and dibenzimidazoles.

7. A screen as claimed in claim 1, wherein the brightening agent is, a water-insoluble but organic solvents-soluble symmetrical stilbene derivative.

8. A screen as claimed in claim 1, wherein the optical brightening agent is, a water-insoluble but organic solvents-soluble dibenzimidazole derivative, and is carried in a reflective layer including flat plate-like basic lead carbonate crystals.

9. A cinematograph screen consisting essentially of a base sheet of polyvinyl plastic pigmented with titanium dioxide, and over one side thereof: a reflectance layer of flat, plate-like crystals of basic lead carbonate dispersed in polyvinyl lacquer solids, said reflectance layer carrying homogeneously dispersed therein from about 0.003% to about 0.3% by weight of an organic brightening agent which is insoluble in water but soluble in varnish solvents and which is capable of emitting bluish white light when impinged upon by invisible radiation in the ultra-violet and near ultra-violet regions.

10. A cinematograph screen comprising a base sheet formed of a sheeted material selected from the group consisting of fabric and synthetic plastic provided with at least one reflective coating accessible to invisible radiation in the ultra-violet and near ultra-violet regions and carrying in homogeneous dispersion therein particles of an organic, water-insoluble but organic solvents-soluble optical brightening agent capable of emitting bluish white light when impinged upon by invisible radiation in the ultra-violet and near ultra-violet regions, said coating including flat, plate-like basic lead carbonate crystals, said optical brightening agent being present in said coating in a weight percent of between 0.003% and 1.0%.

References Cited in the file of this patent

UNITED STATES PATENTS

| | | |
|---|---|---|
| 1,506,729 | Stewart | Aug. 26, 1924 |
| 1,532,782 | Sheppard et al. | Apr. 7, 1925 |
| 2,528,323 | Thomas | Oct. 31, 1950 |